United States Patent Office 3,490,143
Patented Jan. 20, 1970

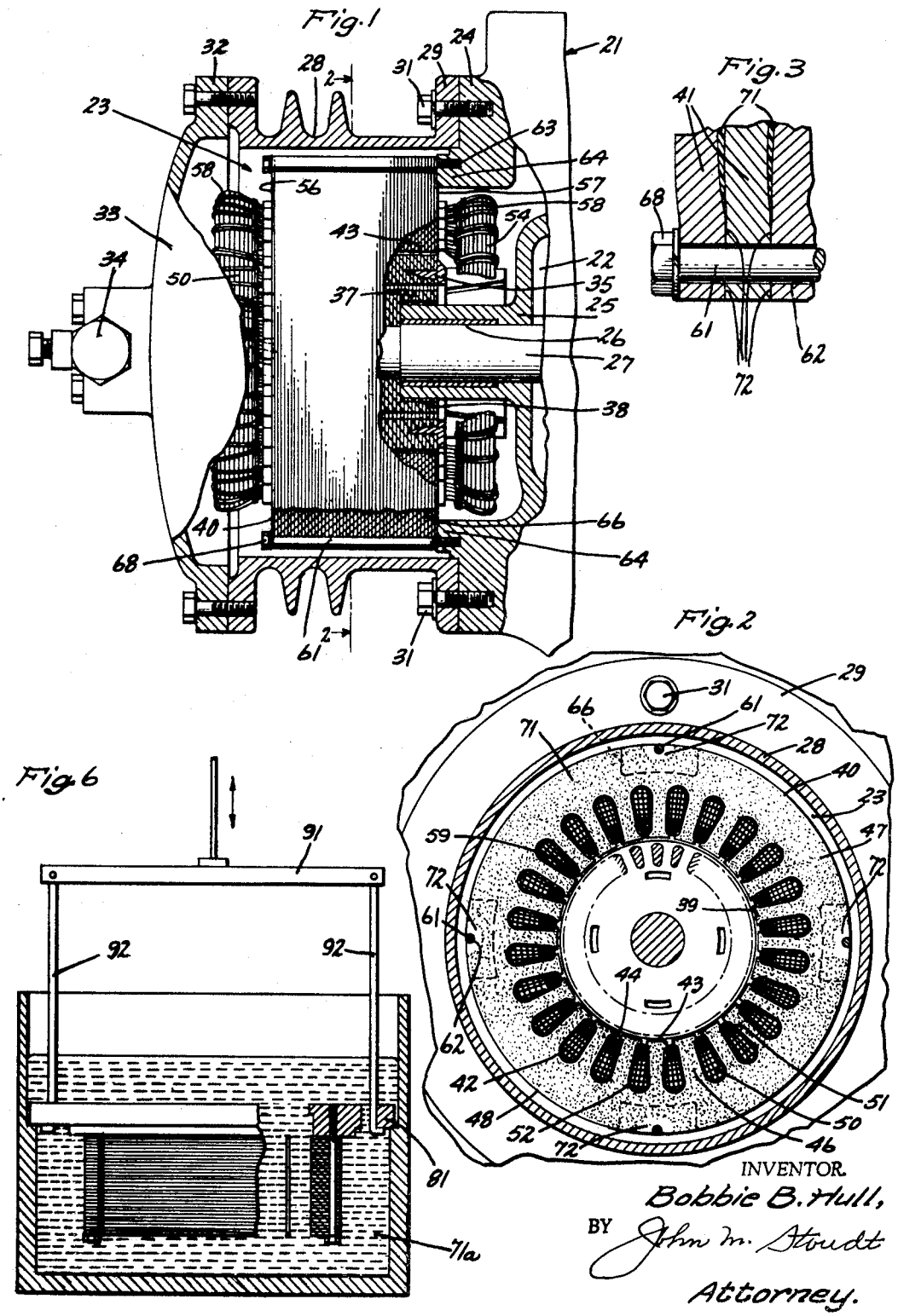

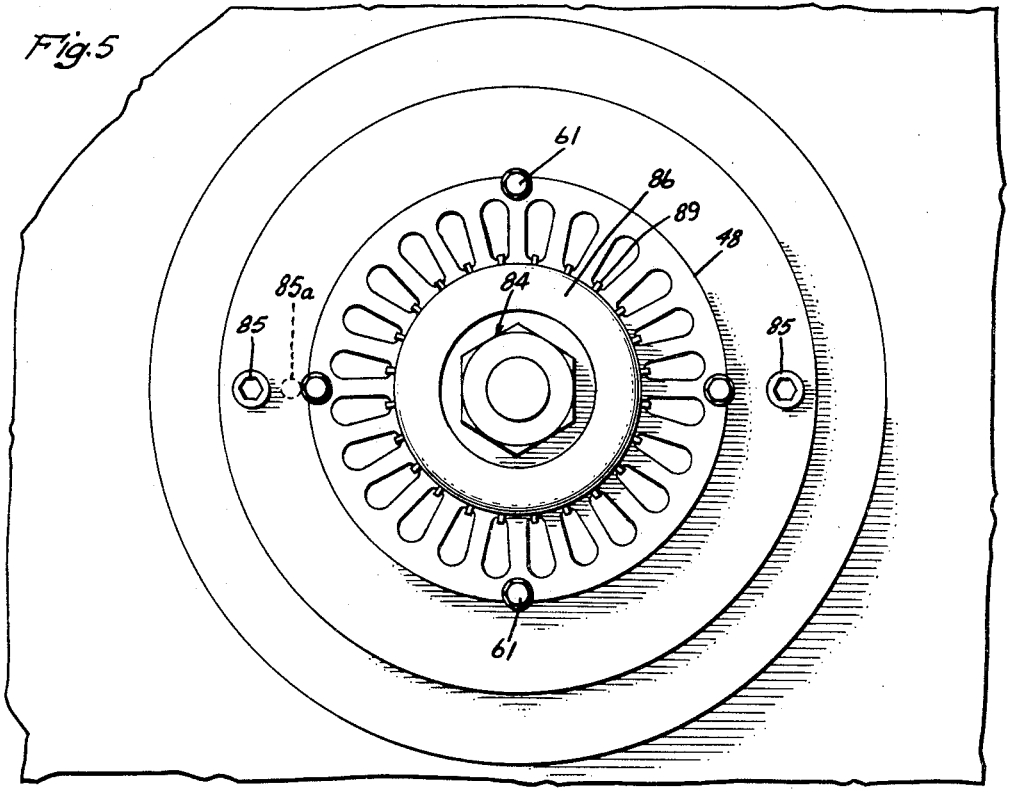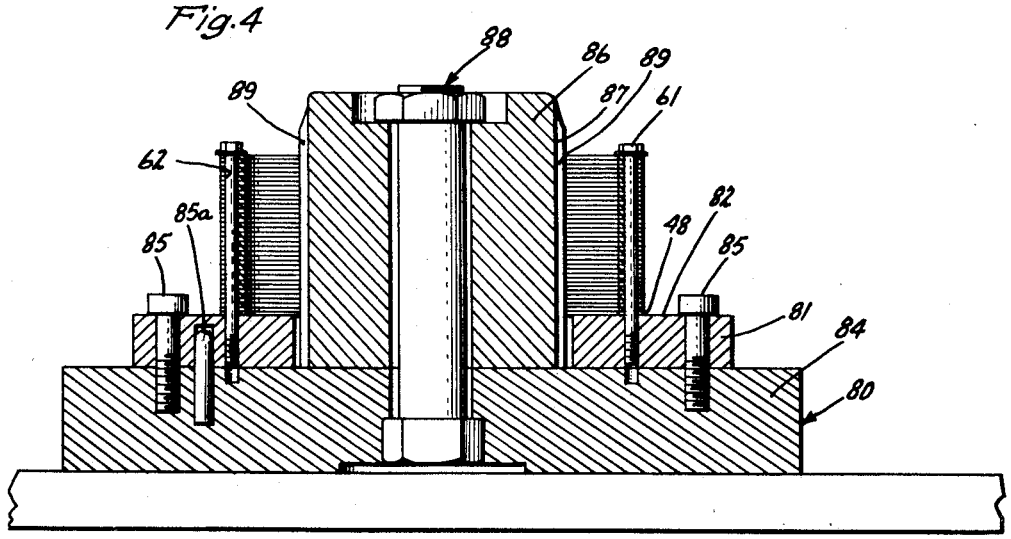

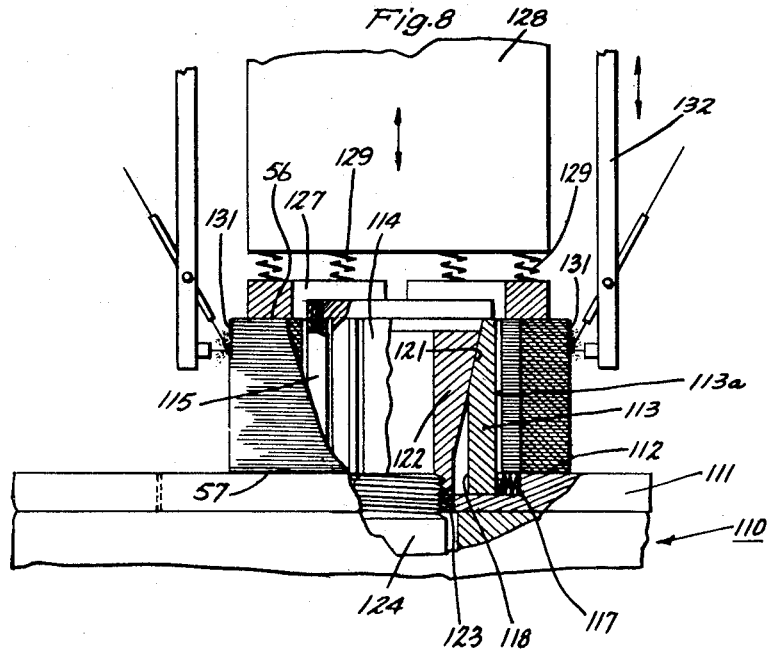
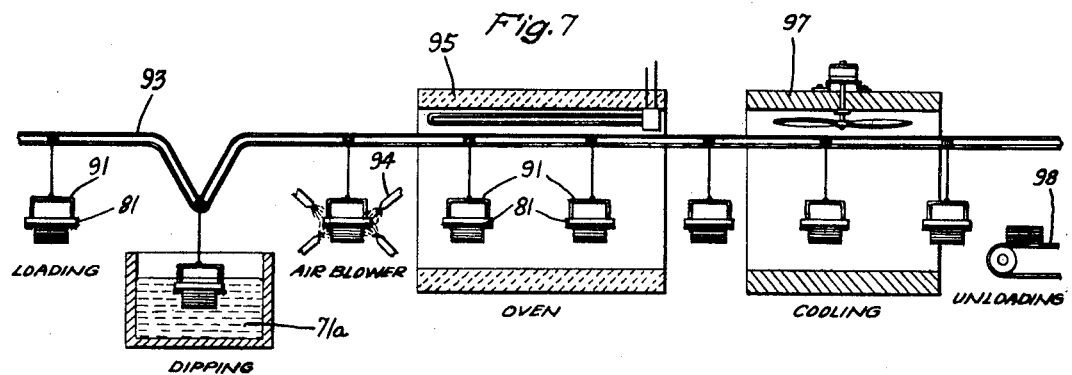
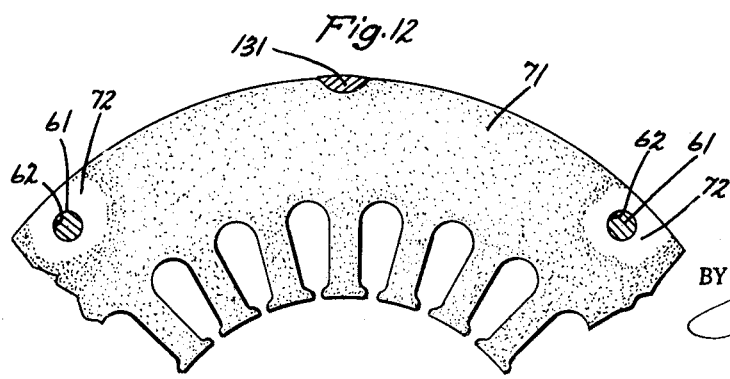
INVENTOR:
Bobbie B. Hull,
BY John M. Stoudt
Attorney.

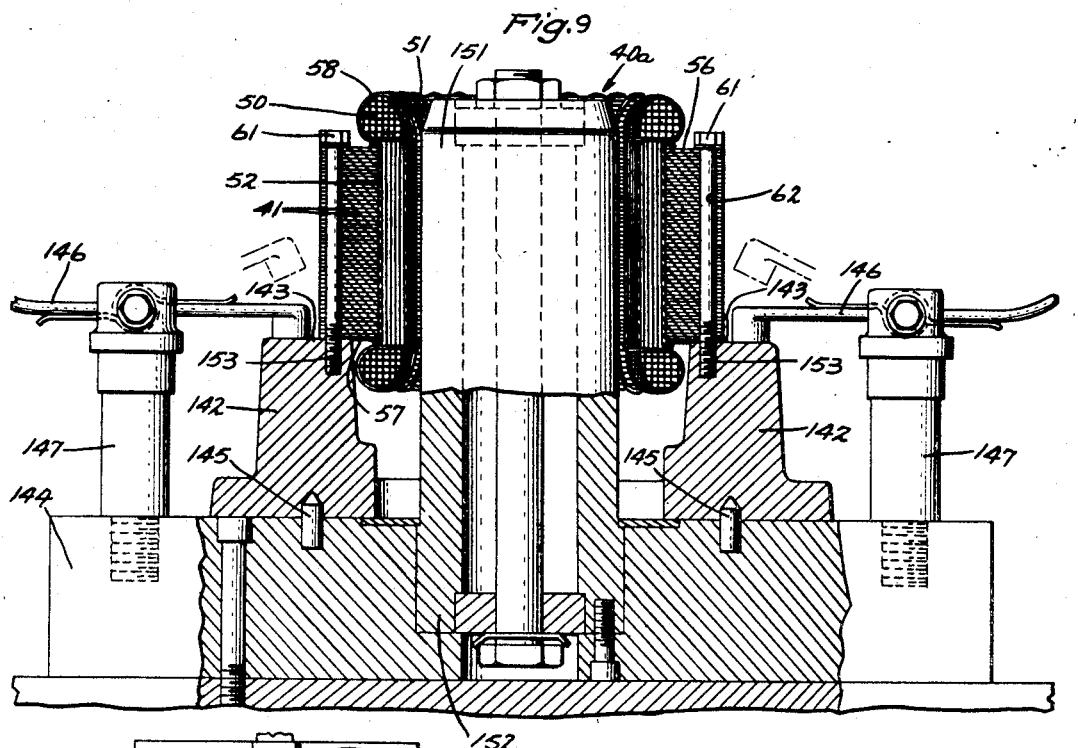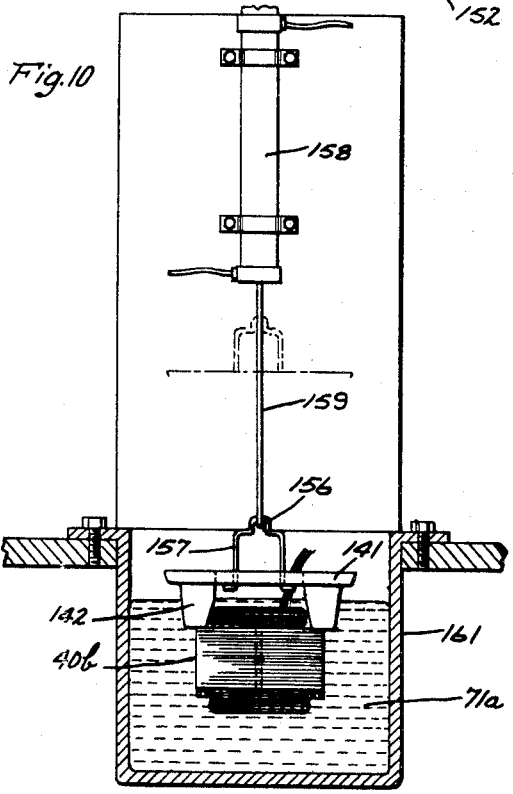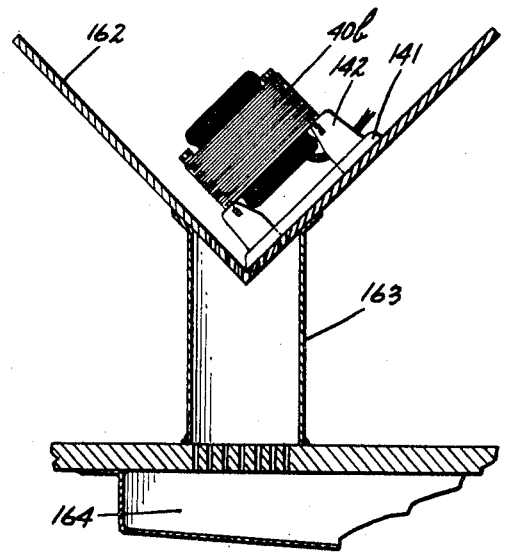

3,490,143
METHOD OF MANUFACTURING A CORE FOR AN ELECTRICAL INDUCTIVE DEVICE
Bobbie B. Hull, R.R. 1, Tiffin, Ohio 44883
Original application June 26, 1964, Ser. No. 378,100, now Patent No. 3,299,304. Divided and this application July 11, 1966, Ser. No. 564,155
Int. Cl. H01f 7/06
U.S. Cl. 29—596           13 Claims

ABSTRACT OF THE DISCLOSURE

In the manufacture of a laminated core for use in inductive devices, laminations having openings therein are stacked to provide a number of passageways entirely through the stack. Compressive force of a sufficient magnitude is applied in the vicinity of selected passageways to produce intimate engagement between interlaminate and uninsulated regions next to the selected passageways, with unhardened insulating bonding material being disposed over other interlaminate regions. Thereafter, as the compressive force is being maintained, the insulating bonding material is hardened to produce a rigid core having low compressibility characteristics.

---

This application is a division of application Ser. No. 378,100 filed June 26, 1964, now Patent 3,299,304. The present invention relates to an improved method of fabricating a laminated core for an electrical inductive device, and more particularly to an improved method of manufacturing a stator especially suitable for use in hermetic motor units.

In the construction of dynamoelectric machines, a stator is usually provided with a laminated core formed of a number of superposed laminations secured together in stacked relation as by a welded structure extending entirely across the periphery of the stack of the type disclosed in U.S. Patent 2,448,785, issued to L. M. Dolan on Sept. 7, 1948. For some dynamoelectric machine applications, as for example, in certain hermetically built refrigeration motor-compressor units, it is customary to mount the stator and rotor members for relative rotation within a motor chamber. In one generally accepted approach, the stator is secured to a stationary frame and supported at one end only with a cantilever type mount to dispose the axis of the rotor receiving bore horizontally within the chamber, co-axial with the axis of the bearings carried by the unit which support the rotor and its shaft. That is, to say one side face of the laminated stator core is normally machined to provide an accurately dimensioned wall perpendicular both to the rotor bore of the core and to the rotational axis of the rotor. This finished face at the core is mounted firmly against a machined or otherwise accurately finished planar surface, located within the motor chamber also formed perpendicular to the axis of rotation for the rotor. A number of mounting bolts extend entirely through the stator core and project into threaded holes tapped into the planar surface of the chamber. These bolts place a compressive load and torsional force on the stator core, the stator laminations being compressed between the bolt heads and the planar surface. This arrangement is intended to position the rotor receiving bore of the stator in a precise, concentric relation to the horizontal axis of the rotor so that when both members are supported in the chamber, a generally uniform air gap is defined between the two members, e.g., in the order of 10 mils across the gap for many applications.

Unfortunately, this generally accepted approach has certain drawbacks which detract from its satisfactory utilization. For example, in spite of the welds or other mechanical lamination securing means provided at a number of angular locations entirely across the axial length of the laminated stator core, the laminations have a tendency to shift radially relative to each other when the stator is mounted to the planar frame surface. This relative lamination shifting, in turn, destroys the co-axial relation of the individual laminations which might have been attained during the formation of the stack and produces a non-uniform air gap, and misalignment between the rotor periphery and the stator bore. Such misalignment results in a noticeable loss of output power for the motor due at least in part to eddy current losses created in the motor. In some cases, the misalignment is sufficiently great to prevent rotation of the rotor in the stator bore.

In studying this problem, I have found that the probable reasons for or factors affecting the radial tendency to shift with the resulting misalignment are complex in nature and may be cumulative in effect. By way of illustration, sudden impact or shock loads transmitted to the core after it is formed but before it has been finally mounted, as by accidentally dropping the core on a hard surface or otherwise mishandling it, may have an adverse effect on the alignment characteristics of the core. In addition, during bolt down of the stator core onto the planar frame surface, uneven or unbalanced torsional compressive loads are applied to the core as the bolts are individually tightened in place, tending to create radial relative shifting of the laminations even though they have been secured together with welds or the like as previously mentioned. For unusually long or heavy stator cores, the core laminations at the free end of the core, that is, remote from the planar surface, tend to shift in a radial direction relative to the remaining laminations due partly to the cantilever type of mounting involved. Another factor upon the tendency to shift is the radial magnetic force produced by the pull of the rotor during motor operation on the individual stator laminations in the vicinity of the bore.

In certain refrigeration motor-compressor applications, such as hermetically sealed compressors, the relative lamination movement problem becomes even more acute. By way of example, it is necessary in many circumstances to remove moisture from the rotor, stator, and other components after the stator has been mounted to the planar frame surface, and after final assembly in the motor-compressor unit so that a minimum amount of moisture is present in the hermetically sealed unit. Thus, these parts are generally subjected to elevated temperatures for prolonged periods; e.g., above 150° C. for 4 hours or more, to evaporate or otherwise vaporize the moisture which may be contained in the parts. In some cases, this procedure is repeated to ensure moisture-free components. However, while this procedure may achieve the desired results of removing moisture from the parts, the individual laminations tend to move relative to one another, both axially and radially, when subjected to the prolonged high temperature condition. I have determined after a careful review and study of the foregoing factors, problems, and considerations that, generally speaking, the higher the compressibility characteristics of the laminated core, the greater will be the tendency of the individual laminations to shift radially relative to one another, regardless of the cause or causes producing the shift. By "compressibility characteristics" is meant the total amount of compression or reduction in length the core experiences in an axial direction for a given load.

It is therefore a general object of the present invention to provide an improved method of maufacturing a laminated core for an electrical inductive device, and it is a more specific object to provide a method of forming a stator which overcomes the difficulties and problems mentioned above.

It is another object of the present invention to provide an improved method of fabricating laminated stator core especially suitable for use in refrigeration motor-compressor application which has low compressibility characteristics and little tendency for relative radial movement of the individual laminations.

It is a still further object of the present invention to form improved laminated cores which are of uniform quality with the relative positions of the laminations being mechanically stable and are capable of manufacture by an improved yet low cost process.

In carrying out the objects in one form thereof, I provide an improved method of maufacturing a stator especially suitable for mounting one of its side faces onto a planar surface in a refrigeration motor-compressor unit. The stator includes a laminated core of low compressibility characteristics having a number of relatively thin magnetic laminations of generally similar configuration arranged in stacked relation, with each of the laminations having a number of openings or holes aligned to form passageways extending entirely through the core. In one form of the process for producing the laminated stator core, the laminations are initially stacked with one side face of the stack disposed against an accurately formed planar surface. Thereafter, the laminations are accurately aligned such that other openings provide a bore having an axis extending perpendicular to the planar surface and passageways or slots for accommodating windings.

The individual laminations are held in the stacked relation, with the previously mentioned alignments being established and with unhardened bondable (thermo-responsive adhesive) material being disposed between next adjacent laminations. Individual predetermined compressive forces, preferably at least as great as those to be used for mounting the core in the refrigeration motor unit, are applied independently to the laminations at spaced locations or areas in the vicinity of preselected holes to create individual predetermined separated pressure regions at those locations. As these separated pressure regions are maintained, the unhardened material is hardened. Any subsequent reapplication of individual predetermined compressive forces of the same general magnitudes at the same locations of the core will tend to re-create similar separated pressure regions. Thus, a core of rigid construction is furnished having the desired features mentioned above. In addition, the side face of the core adapted for mounting to a planar surface in the motor-compressor unit need not be machined in order to provide a bore axis which extends perpendicular from the planar surface of the unit with the desired accuracy.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

In the drawings:

FIG. 1 is a fragmentary sectional view of a hermetic refrigeration electric motor and compressor unit incorporating a stator having a core constructed with one form of the present invention;

FIG. 2 is a view taken along line 2—2 in FIG. 1 to show the manner in which the stator laminations are secured together;

FIG. 3 is an enlarged fragmentary view of a part of the stator of FIG. 1 to illustrate the way in which the laminations, interlaminate bonding material, and the through-bolts cooperate;

FIG. 4 is a sectional view of a step in fabricating the stator core of FIG. 1 revealing the preferred way in which the individual laminations are stacked, aligned, and temporarily secured together;

FIG. 5 is a plan view, partially broken away to show details of the apparatus and laminated stack seen in FIG. 4;

FIG. 6 is a sectional view of the aligned stack of laminations illustrated in FIGS. 4 and 5 showing the stack being immersed in suitable bonding material while the laminations are temporarily held to a fixture of the apparatus seen in FIG. 4 by through-bolts;

FIG. 7 is a schematic representation of the preferred step-by-step formation of the stator core of the exemplification after the core holding fixture and stacked laminations have been dismantled from the apparatus of FIGS. 4 and 5;

FIG. 8 is a partial view, partly broken away, of another manner of forming a stator core for the motor-compressor unit of FIG. 1;

FIG. 9 is an enlarged view of the stator core of FIG. 8, showing the cores mounted on a fixture having an accurately finished wall simILating the mounting surface in the motor-compressor unit after the winding coils have been arranged in place in the core and the winding end turns have been formed to the desired shape;

FIG. 10 is a sectional view of the stator, including the core and windings, being immersed in a container of suitable bonding material with the stator core mounted on the fixture seen in FIG. 9;

FIG. 11 is a sectional view showing excess bonding material draining from the stator after it has been removed from the container of FIG. 10 preparatory to the hardening of the bonding material; and FIG. 12 is a partial view broken away of the stator core formed by the procedure revealed by FIGS. 8–11 to show details.

Turning now to a more detailed description of the drawings, and in particular to FIGS. 1–3 inclusive, one form of the present invention is shown as applied to the manufacture of the laminated stator core of a hermetically sealed motor-compressor unit, partially illustrated in FIG. 1 and generally indicated by numeral 20, suitable for use in a refrigeration system. In this exemplification of the invention, unit 20 includes a hermetically sealed cast casing 21 of conventional design forming communicating motor and compressor chambers 22, 23 respectively. The compressor chamber 23 is provided by an enlarged housing 24 cast integral with a central axial tubular extension 25 which projects into the motor chamber and mounts a sleeve type bearing 26 for rotatably supporting a section of a main drive shaft 27. The main drive shaft, in turn, has a crank shaft section connected to a reciprocating piston in driving relation therewith (not shown). Since the components of the compressor part of the unit may be of any suitable and well-known standard construction, no further description will be set forth.

With regard to the illustrated details of motor chamber 22, it will be observed from FIG. 1 that casing 21 has a cylindrical cast shell 28 attached at one end to a wall of housing 24 through the intermediary of a radial flange 29 and a number of angularly spaced screws 31 extending through the flange and into complementary threaded holes provided in housing 24. The other end of shell 28 also includes a radial flange 32 which mounts an enclosure member 33, provided with the customary inlet port-valve assembly 34.

Mounted within chamber 23 for driving shaft 27 is an electric motor having a stator 40 which incorporates one form of my invention. For purposes of illustration, the motor is of the type commonly employed in hermetic refrigeration motor-compressor units; i.e., unidirectional alternating current induction single phase, having a rotor 36 such as that shown and described in U.S. Patent No. 3,075,106 issued to Jerome N. C. Chi and assigned to the same asssignee as the present invention. The rotor has a laminated core 37 secured to shaft 27 for rotation therewith, as by an interference fit, and is counterbored at one end 38 so as to overhang extension 25 in spaced relation thereto. The outer periphery of the core is finished to form an accurately dimensioned cylindrical surface 39 made concentric to the rotational axis of shaft 27. The core carries a standard cast squirrel cage winding 35 short circuited at each end in the usual way.

Turning now to a description of stator 40, it will be observed from FIG. 2 in particular that the illustrated stator includes a laminated core fabricated from a preselected number of identical punchings or laminations 41, stamped or punched from magnetic sheet material, such as steel or the like. During the stamping operation, each lamination is provided in the usual way with a plurality of angularly and equally spaced apart generally radial, openings or notches 42 and a central circular opening or aperture 43, with the notches and bore being in communication through narrow entrances 44. Intermediate the notches are teeth sections 46 which are joined to a yoke section 47 located outwardly of the notches, section 47 terminating in a circular peripheral outer edge 48. When notches 42 and aperture 43 of the individual laminations are aligned in a manner to be described hereinafter, they form axially extending passageways commonly referred to as winding accommodating slots and a rotor receiving bore respectively. Each slot conventionally carries coil sides of a main running winding 50 and an auxiliary winding 51 suitably insulated from the core by any convenient means; e.g., cuffed liners 52 such as described in U.S. Patents 2,169,097 and 2,180,983 issued to Hall. The coils have end turns 54 (FIG. 1) projecting beyond the respective side faces 56, 57 of the core which are held in a compact mass by cord 58 and phase insulators 59 are employed between windings 50, 51 in the usual way.

Before further details are outlined of stator 40, the manner in which the stator is firmly mounted in the desired location within the motor chamber seen in FIG. 1 will be considered. Four angularly and equally spaced apart through-bolts 61 project axially through passageways formed by aligned but slightly enlarged openings or bolt holes 62 which may be furnished in the yoke sections of the individual laminations adjacent edge 48 during the stamping operation. The threaded end 63 of the respective bolts (FIG. 1) is threadingly received in a complementary hole arranged in each of four axial, angularly spaced, casing extensions 64 made integral with housing 24. The extensions terminate in flat, accurately machined planar surfaces 66 which are all located in a common plane projecting perpendicular or normal to the rotational axis of the motor. Side face 57 of the stator core is held firmly between planar surfaces 66 and bolt heads 68 by a predetermined force, with stator bore 43 being arranged concentric to the rotational axis of shaft 27 and surrounding the rotor to define a generally annular air gap with rotor periphery 39.

As best seen in FIGS. 2 and 3, the stator core of the exemplification is constructed with hardened adhesive material 71 contacting juxtaposed laminations to hold them rigidly together, which in the first illustrated embodiment of the present invention, does not cover next adjacent lamination sides in the interlaminate regions surrounding or in the immediate area or vicinity of the individual bolt holes 62. These regons, denoted by numeral 72 in the figures, are generally free of material or generally uninsulated and permit controlled engagement of the next adjacent laminations at that location when bolts 61 mount the stator to planar surfaces 66. It has been found that with this arrangement, the core has excellent assembly stability and relatively low compressibility characteristics and the tendency of radial shift among the laminations is minimized, if not entirely eliminated. For example, during repeated assembly and dismantling of the stator onto and from planar surfaces 66, in actual practice the laminations do not appear to change their relative radial positions with respect to one another. The same is also true upon repeated heating of the stator, as might occur, for example, when it is being dehydrated after final installation into casing 21 or when it is in operation in unit 10. Further, unbalanced loads applied on the core as the stator is being bolted down onto surfaces 66 do not appear to change the excellent stability and alignment characteristics of the core.

It should be noted that in the preferred form not only are regions 72 generally uninsulated or substantially free of material 71, but, also, for best results, it has been found that end faces 56 and 57 should be bare; e.g., devoid of insulation, at the locations where they touch bolt heads 68 and planar surfaces 66 respectively. It should be additionally noted that even though next adjacent laminations are in pressure engagement at regions 72 in the vicinity of the bolt-holes, this contact does not detract from the beneficial results achieved in reduction of eddy current core losses resulting from the slight lamination separation effected by material 71. Of course, the precise number and size of bolt holes, their exact locations in the yoke section, and the total area of regions 72, in order to derive optimum benefits from the present invention for a given application, will be dependent upon such factors as overall size and weight of the stator, among others.

With respect to the attributes of material 71, by way of example, in the preferred embodiment it is in the form of a relatively thin interlaminate, but not necessarily continuous film (greatly exaggerated in FIG. 2) adhering to adjacent laminations. It is preferably a cured thermoresponsive high temperature insulating and bonding material, such as a thermosetting acrylic or epoxy resin type varnish. To provide the greatest possible availability of magnetic material for a given stack length, it is desirable that material 71 have a relatively thin interlaminate crosssection, the preferred manner of formation being set out hereinafter. For refrigeration applications, material 71 should also be compatable with the refrigerant of the system; that is, it should be insoluble in the refrigerant and should not be adversely affected or attacked by the system components.

Further advantages and benefits of the present invention will become more apparent from a consideration of FIGS. 4–7 inclusive which reveal the preferred form of the process for manufacturing the stator of FIGS. 1, 2, and 3.

In one form, after the punchings or laminations 41 have been stamped or otherwise cut into the desired configuration, such as that already outlined, the punchings may be suitably annealed, and then cleaned by any well-known procedure (not shown). Thereafter, the laminations are stacked to a preselected height and properly aligned to form passageways for receiving through-bolts 61, axially extending slots to accommodate the windings, and rotor receiving bore 43 provided perpendicular to side face 57 of the end lamination of the stack. During alignment of the laminations, side face 57 of the stack rests upon a planar surface which, in effect, simulates the planar surfaces 66 of the housing 24. Further, the regions of the individual laminations around the individual holes forming the through-bolt passageways are held in intimate contact relation with the same type of force that the core will experience when finally assembled within case 21 of FIG. 1. The foregoing may be achieved by stacking the laminations onto the lamination holding device 80 shown in FIGS. 4 and 5.

By way of example, the device has a removable ring 81 machined flat on one side to provide a planar surface 82. The ring preferably extends radially beyond edge 48 of the end laminations in the stack and is detachably secured to a base plate 84 by a pair of diametrically opposite screws 85 and pins 85a. In order to align the laminations, a mandrel 86 is suitably connected to base plate 84, centrally of ring 81, with the cylindrical outer surface 87 of the mandrel disposed perpendicular to planar surface 82 of ring 81 as best seen in FIG. 4. A bolt and nut arrangement, generally indicated by numeral 88, may be used to hold the mandrel and the base plate together in assembled relation. Outer surface 87 of the mandrel includes radial projections 89 which fit into slot entrances 44 to provide axial alignment for the laminations of the stack.

Through-bolts 61, identical to those to be used in the final mounting of the core within casing 21 of the unit, are employed to bolt down the stack onto planar surface 82 of the ring with the same approximate bolt-down force as will be experienced by the core when finally mounted on surfaces 66 within the motor-compressor unit. In this way, the laminations in the vicinity of region 72 around each bolt hole will have lamination-to-lamination contact.

With the predetermined force maintained on contacting region 72 around the bore holes and side face 57 of the end lamination of the stack held firmly against planar surface 82, the adhesive material 71 may be applied in an unhardened state by any convenient manner between adjacent laminations to form the thin adhesive layer or film, best seen in FIGS. 2 and 3 and previously described.

FIG. 6 shows one way in which this application may be achieved after the stack and ring subassembly has been dismantled from plate 84 by removal of screws 85. The subassembly is subsequently mounted to a hooked carrier, generally identified by numeral 91, having suitable hooked ends 92 which extend through the opposed screw receiving openings in ring 81 to support the subassembly with the stack depending therefrom. The depending stack is dipped or immersed into unhardened adhesive material 71a by lowering the carrier in the manner indicated by the arrow in FIG. 6. The unhardened material will be introduced through all exposed surfaces of the stack; e.g., bore or opening 43, slots, and the outer periphery, in between the individual laminations to cover the teeth and yoke sections except in the regions being maintained in firm contact by bolts 61. This serves to keep the immediate area around the bolt holes free from the material. The exact size and shape of regions 72 will, of course, be primarily dependent upon the size and shape of the means for applying the compressive force at those locations to the core; e.g., the bolt heads and planar surfaces 82 in the exemplification. It is believed that the laminations form a wick for the adhesive material and there is a natural tendency for the material to be drawn between next adjacent laminations due to capillary action. This material, however, may, of course, be injected or otherwise forced between the laminations with sufficient pressure to provide adequate penetration. However, such penetration should not be so extensive as to cover regions 72 of the laminations.

After material 71a has been applied, excess material may be removed from the exposed surfaces of the core as well as ring 81 where coverage is not desired and the material subsequently hardened or solidified sufficiently to bond the laminations rigidly together. This procedure lends itself quite well to automation which is depicted schematically in FIG. 7. The stack of laminations, temporarily attached to ring 81 as previously outlined, may be assembled as a subassembly at a loading station to carrier 91 which in turn depends from overhead conveyor 93. The laminated stack may then be dipped as discussed in connection with FIG. 6 and transferred immediately to the next station where excess adhesive material is removed. With ring 81 disposed above the stack, the adhesive material will tend to drain away from surfaces 57 and 82 of the stack and ring respectively. Blowers 94 or other suitable means, such as wipers or brushes (not shown) may be utilized to perform this function. The conveyor then transports the carrier and its subassembly through an oven 96 where heat is applied to material 71 for curing it as the individual predetermined compressive forces are being applied or maintained independently to the laminations respectively at the spaced apart locations (regions 72). The exact temperature of the oven and length of cure are primarily related to the composition of thermoresponsive material 71. Finally, the carrier and its subassembly are cooled, as at a cooling station 97, and the stack of bonded laminations are dismantled from carrier 91. Thereafter, the bonded together stack may be placed on a continuous belt type conveyor 98 and transported to machinery for inserting slot liners 52, forming the windings and otherwise completing the fabrication of stator 40 by well-known techniques.

The following example is given to illustrate how the invention, as described above, has been carried out in actual practice and the advantages which can be derived therefrom. A quantity of stator cores were similarly fabricated in the preferred form as already outlined. The cores had a nominal bore diameter of 3⅛ inches, an outer nominal diameter slightly over 6¼ inches, and a nominal stack length of 3 inches. The round laminations each had a thickness of 0.018 inch and were stamped with the type of slots and number of bolt holes shown in the illustrated embodiment of FIGS. 1–7. Four bolts, ¼ inch in diameter, were each tightened to a torque of 140 inch-pounds when the laminations 41 were initially mounted to ring 81 as the subassembly. Thermosetting acrylic and epoxy resins were used as the interlaminate adhesive material 71. Subsequent to the completed formation into stators, bolts 61 mounted the cores onto planar surfaces 66 of casing housing 24 with a similar bolt torque of 140 inch-pounds. Each stator core and housing was then subjected to a temperature of 155° C. for six hours for dehydration purposes. All stator cores were inspected and showed no discernable change in lamination alignment attained during their fabrication. In addition, they had good electrical qualities and their compressibility and torque retention characteristics were tested. A partial tabulation of the test results for a representative stator core is set out below:

| Bolt Identification: | Bolt turning angle in degrees necessary to produce 140 inch-pounds (″-#) for mounting cores to surfaces 66 | Bolt torque measured after dehydration (″-#) |
|---|---|---|
| No. 1 | 110 | over 140 |
| No. 2 | 115 | over 140 |
| No. 3 | 110 | over 140 |
| No. 4 | 105 | over 140 |
| Average | 110 | over 140 |

Consequently, as indicated by the above table, the core compressed only slightly in an axial direction (average 110° produced a bolt-down torque of 140 inch-pounds) and the core did not change in either accuracy of lamination alignment or retention of the applied forces. This was the case in spite of the fact that thermosetting resin material has a well-known creepage or flow characteristic which is exaggerated at temperatures in that range, an inherent property of cross-linked materials.

The advantages and benefits of the foregoing become even more significant and striking when compared with proposed stator constructions using the same interlaminate adhesive material to bond laminations together which do not incorporate the present invention. For purposes of comparison, a number of laminated cores incorporating identical laminations with those used for the above example were bonded together to form cores of the same nominal dimensions by the procedure suggested in the M. B. Sawyer U.S. Patent No. 2,057,503 issued Oct. 13, 1936. Succinctly stated, the individual laminations of the stack were lowered in loose relation into unhardened adhesive material 71 and their interlaminate faces, including all surfaces of the yoke and teeth sections, were completely covered with the material. Thereafter, the yoke sections of the stack were compressed axially between a pair of rings with a pressure of approximately two tons and all but a very thin film was squeezed out from between next adjacent laminations. While this pressure was maintained on the stack, material 71 was cured. These finished stator cores were then mounted onto planar surfaces 66 by four bolts, each applying a torque of 140 inch-pounds and subjected to the same heating or dehydration conditions mentioned above for the stator cores incorporating the present invention. The following are the test results of a typical core in this lot:

| Bolt Identification: | Bolt turning angle in degrees necessary to produce 140 inch-pounds ("-#) for mounting cores to surfaces 66 | Bolt torque measured after dehydration ("-#) |
|---|---|---|
| No. 1 | 175 | 100 |
| No. 2 | 180 | 95 |
| No. 3 | 145 | 90 |
| No. 4 | 175 | 95 |
| Average | 169 | 95 |

Thus, these cores not only had higher compressibility characteristics than the stator cores made in conformance with my invention, but they also were not stable, losing their torque retaining qualities. Further, among other shortcomings, the alignment qualities of the individual laminations were not as satisfactory as those attained with the present invention and a repeated application of bolt torque to the cores seemed to have a tendency to change the relative positions of the individual laminations in spite of the bonding strength attributable to cured material 71.

FIGS. 8–12 inclusive show the preferred fabrication of a stator, suitable for mounting in casing 21 of FIG. 1, which has mechanical means; e.g., welds, supplementing the securement achieved by hardened adhesive material 71. In this procedure, the material introduced between the laminations may also advantageously be applied concurrently to the interstices of the winding sides and end turns for bonding the wire turns of the winding together. In these latter figs., identical parts with those already described in connection with FIGS. 1–7 are indicated by like numerals.

After laminations 41 have been formed by a stamping operation, they are stacked into the desired height and properly aligned relative to one another on a holding device, such as that indicated by numeral 110 in FIG. 8. The illustrated device 110 includes a steel base plate 111 furnished with an upper planar surface 112 for temporarily supporting the stack of laminations. A central collet type assembly, arranged within bore 43 of the stack, is used to align the laminations. For instance, the collet has a number of individually movable elements 113, formed with arcuate-shaped outer walls 114, separated by stationary studs 115 and are radially movable between retracted and extended positions within bore 43 of the laminations. Each element may include axial ribs 113a to fit into slot entrances 44 for alignment purposes. In the retracted position, walls 114 of diametrically disposed elements are of less diameter than that of bore 43. Any suitable means, such as coil spring 117 positioned in circular recess 118, may bias the elements toward that position.

The upper, inner walls 119 of elements 113 are inclined to cooperate with the outer inclined wall 121 of an inverted frusto-conical shaped member 122, which extends downwardly into a central opening 123 in plate 111 and is connected to end 124 of a piston (not shown). Downward movement of piston end 124 to the location shown in FIG. 8 drives member 122 in that direction. During this travel, inclined wall 121 forces elements 113 from their retracted to their extended positions, overcoming the bias of springs 117. Arcuate shaped walls 114, being sectors of the same circle, will thus move firmly into engagement with the bore 43 of the laminations and, with ribs 113a, serve to align the laminations.

As the piston is being operated and elements 113 are moved to their extended positions, a preselected compressive force is applied axially to the stack, such as by curved steel blocks 127 adapted to engage side face 56. A unit force in the range of 200–1000 pounds per square inch has been found to be quite satisfactory in this regard for most applications. The blocks are, in turn, attached to a piston head 128 by coil springs 129 which act to cushion the force of the blocks as the blocks engage face 56 of the laminations. With the laminations aligned and held under axial compression, welds 131 intermediate each bolt passageway are simultaneously formed on the stack periphery for its axial length by angularly spaced and axially movable welding mechanisms 132 of standard design. For reasons to be explained hereinafter, it is desirable that the welds be located beyond the immediate vicinity surrounding bolt holes.

With the welds serving to hold the laminations firmly together in stacked relation, the stack may be blue annealed and furnished with finished windings suitably insulated from the stack. With the stator completed as shown in FIG. 9, the interlaminate oxides which may have been formed during anneal and bind next adjacent laminations together are broken and the laminations finally aligned preliminary to the introduction of unhardened adhesive material between the laminations. To achieve this end, side face 57 of the end lamination of the stator is temporarily held against planar surfaces simulating surfaces 66 in FIG. 1 and the laminations are compressed axially in the vicinity of the bolt holes 62 with the same approximate force as used in the final mounting. The equipment for accomplishing the foregoing is seen in FIG. 9 and includes a cast iron ring 141 having spaced apart upright sections 142 each terminating in a planar surface 143 simulating in area and relationships planar surfaces 66 of housing 24. Thus, like the exemplification of FIGS. 1–7, there are four equally and angularly spaced apart surfaces 143. Ring 141 is detachably held onto a stationary base 144 by a number of pins 145 and spring biased retainers or clamping members 146, pivotally carried by upright posts 147 located outwardly from ring 141. There is a member 146 and post to cooperate with each upright section 142.

Centrally of ring 141 and base 144 is a rigid elongated sleeve or cylindrical plug 151 having one of its ends 152 suitably secured within a recess of base 144. The other end of the plug projects upwardly, between the four sections 142, so as to provide an outer peripheral surface perpendicular to planar surfaces 143. Consequently, stator 40a, having the welded core and windings 50, 51 arranged in place, is assembled over plug 151 and bolted down with a force approximating that to be used in casing 21 by four through-bolts 61 which extend through the bolt holes 62 and into complementary threaded holes 153 in sections 142. Core side face 57 will thus be located against planar surfaces 153 in the same manner as that provided by housing surfaces 66 and plug 151 will finally align the laminations. During placement of the stator core over the plug and into the position seen in FIG. 9, a rubber mallet (not shown) or other impact type apparatus may be employed against the periphery of the core for the purposes of assembly and breaking the interlaminate oxide bonds, if any. In actual practice, a plug having machined diameter of 3.120 inches has been satisfactorily used with core laminations having a tolerance bore diameter from 3.125 to 3.1265 inches.

Ring 141 and stator 40a are then dismantled as a subassembly from the equipment seen in FIG. 9 and unhardened thermoresponsive material 71a may then be applied concurrently both to the end turns for filling the interstice thereof, that is, impregnating the windings, and entering any voids or spaces between next adjacent laminations of the welded core. This may readily be accomplished by a dipping step shown in FIG. 10. For instance, the subassembly may be attached onto a movable carrier 156 having hooked ends 157 adapted to engage ring 141 in the manner seen in FIG. 10. It should be noted at this time that ring 141 permits exposure of the winding end turns as well as the bore and outer periphery of the core so that the unhardened adhesive material 71a can readily enter the desired portions of the stator. To insure this end, stator 40a should not, of course, include any components in the bore and preferably at its outer longitudinal periphery which could interfere with the unimpeded admission of the unhardened material to the windings and between the laminations. Further, the unhardened liquid material 71a should be sufficiently fluid to allow its entry into the confines of the windings and between the laminations 41. A piston 158 and its rod 159 is shown attached to the upper end of the carrier 156 for lowering the subassembly into an open-ended container 161 having the unhardened adhesive material 71a.

Immediately after the application of unhardened material 71a to the end turns and between next adjacent laminations by the immersion step described above, excess material may be removed from the exposed surfaces of the subassembly by any convenient means. For example, the stator, indicated by numeral 40b in FIG. 11, and the ring 141 may be placed onto a V-shaped rack 162, and excess material recaptured through conduit 163 and communicating channel 164 as it drains off of the subassembly. If desired, of course, excess material may be wiped, brushed, or otherwise removed at this time. Finally, the material in between laminations may be hardened or cured in the manner already explained in connection with the procedure of FIGS. 4–7. When cured, the material secures the laminations together and bonds the windings into a compact mass. Obviously, in the process of FIGS. 8–11, material 71a need be applied to only one of the winding end turns or to none at all by proper masking of the winding if such is desired, but the procedure is particularly beneficial for impregnating both end turns.

As seen in FIG. 12, which shows a portion of the stator in section with the windings and related parts removed, like the embodiment of FIGS. 1–7 inclusive, regions 72 which are devoid of interlaminate hardened adhesive material 71 surround bolt holes 62. Consequently, even with welds 131, the laminations are relatively free to make the desired intimate engagement in these locations as the stator is bolted down on planar surfaces 66 in casing 21 of FIG. 1 and the welds and material 71 conjointly secure the laminated stack securely together. While, for any given size core, the procedure of FIGS. 8–11 may not always provide as much total interlaminate surface area coverage of material 71 as that of FIGS. 4–7, the welds augment the bonding strength attributed to that material.

It should be obvious to those skilled in the art that as used herein in connection with the illustrated embodiments of FIGS. 6, 7, 10, and 11, the term "unhardened material 71a" may be, among other things, commercially available adhesives in liquid or highly plastic form, or in solid, finely granulated or powdered form suspended in a suitable liquid carrier. If in the later form, the particles must be sufficiently small in order to penetrate between the laminations to the desired depth, and in the case of FIGS. 10 and 11, to become embedded within the confines of the windings. The compactness of the windings also has a bearing on the depth of penetration achieved by material 71a. During the heating step in the illustrated embodiments, this latter type of unhardened material 71a initially coalesces into a generally integral adherent coating which then becomes hardened when it cures. Unhardened material in whatever form having a Brookfield No. 1 viscosity at 4 r.p.m. of less than 100 centipoises should meet the requirements for most core situations known to me. It should also be recognized that magnetizable metal laminations 41 inherently include slight depressions and other irregularities on their surfaces, and that in the illustrated embodiments of the present invention, the adhesive material in its unhardened state may enter and be held in these depressions in interlaminate regions 72. However, the quantity contained by these imperfections is not sufficient to interfere with the pressure type metal-to-metal engagement obtained at these interlaminate bolt hole locations.

The advantages and features of the present invention are readily manifest from the above description. It is now possible to produce an improved laminated core by a practical process particularly suitable for mass production use. The process produces stator cores, especially suitable for refrigeration motor-compressor applications, which incorporate accurately aligned laminations in a rigid stack with a minimum of variation between the individual cores so constructed at a relatively low unit cost. These stator cores have low compressibility characteristics, a high degree of stability and strength, and effectively resist, if not entirely overcome, the tendency of the individual laminations to shift radially relative to one another from causes, such as those previously listed. In addition, they retain the accurate alignment of laminations even under adverse conditions where the loads applied to the core from whatever source vary in degrees of magnitude and intensity. Further, the cores may be operated at relatively high temperatures and have non-machined end faces mounted in cantilever supporting fashion, without producing any adverse effects on the accurate alignment ensuing from the process of their formation.

While in accordance with the patent statutes, I have described what at present are considered to be the preferred embodiments of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A method of forming a magnetizable core for use in an electric inductive device, the core having a number of magnetic laminations, interlaminated hardened adhesive material, and a plurality of selected interlaminate magnetic regions of next adjacent laminations at spaced apart locations being substantially free of the material and adapted to provide intimate engaging relation at spaced apart locations between next adjacent laminations at the preselected interlaminate magnetic regions; the method comprising the steps: arranging the laminations, each having a plurality of openings in stacked relation with the openings aligned to form winding accommodating means extending axially through the core; introducing unhardened adhesive material between adjacent laminations while concurrently holding the laminations under compression by the application of predetermined forces thereto in the vicinity of a plurality of selected interlaminate spaced apart regions to produce intimate engagement between the plurality of selected regions of next adjacent laminations thereby to prevent the material from covering the plurality of selected regions; and hardening said material to bond the laminations together while maintaining the laminations under compression in the vicinity of the plurality of selected regions by the predetermined forces whereby the individual laminations in the plurality of selected interlaminate regions are substantially free of the hardened material and the holes tend to assume generally the same intimate engagement with respect to one another when forces of the same general magnitudes are subsequently re-applied to the core at the same plurality of selected regions.

2. A method of forming a stator core for use in an electrical inductive device from a number of laminations each having an aperture and a selected plurality of openings comprising the steps: arranging the laminations in stacked relation on a planar surface, and aligning apertures and the selected plurality of openings in the individual laminations to form respectively a rotor accommodating bore having an axis generally perpendicular with the surface and a plurality of passageways extending axially through the core, with unhardened adhesive material disposed between next adjacent laminations; holding the laminations on the planar surface under compression by the application of predetermined compressive forces independently onto interlaminate regions of next adjacent laminations in the vicinity of said selected pluralities of openings, with said predetermined compressive forces tending to prevent the material from entering the interlaminate regions; and hardening said material to bond the laminations together as the predetermined compressive forces are applied in the vicinity of the selected plurality of openings, whereby the individual laminations in the interlaminate regions in the vicinity of the selected plurality of openings assume substantially the same relative positions with respect to one another when forces of substantially the same magnitudes are subsequently re-applied to the core in the same location.

3. A method of forming a stator core, for use in a dynamoelectric machine, fabricated from a number of laminations each having a plurality of openings comprising steps: arranging the laminations in stacked relation on a planar surface with at least some of the plurality of openings aligned to form respectively a rotor accommodating bore having an axis perpendicular to the surface and a selected number of passageways extending axially through the core for accommodating means to secure the stator to a support; applying predetermined compressive forces to the end face of the stack primarily in the vicinity around the selected number of passageways; introducing unhardened thermoresponsive adhesive resinous material between adjacent laminations while concurrently holding the laminations under said compression by said predetermined forces to prevent the material from covering interlaminate areas surrounding at least some of the plurality of openings; and hardening said material to bond the laminations together while maintaining the predetermined forces in said vicinity around the selected number of passageways whereby the individual laminations at their respective interlaminate areas assume substantially the same relative positions with respect to one another when compressive forces of the same general magnitudes are subsequently re-applied to the core in the same locations.

4. A method of forming a stator for use in a dynamoelectric machine having a core fabricated from a number of similiar laminations each having a plurality opening and at least two holes spaced from the openings comprising steps: arranging the laminations in stacked relation and aligning the openings to form respectively a rotor accommodating bore and winding accommodating means and at least one aligned passageway extending axially through the core for receiving means to secure the stator to a support; applying a predetermined compressive force to the core in the vicinity around each passageway; securing the laminations together at angular locations intermediate the passageways while said compressive force is being applied thereto; removing said compressive force and arranging windings in the winding accommodating means of the core; applying another compressive force to the core in the vicinity around each passageway; immersing the core and windings into unhardened thermoresponsive adhesive material and introducing said material between adjacent laminations and covering said windings while concurrently holding the laminations under compression by the application of another compressive force thereto in the vicinity around each passageway to prevent the material from covering interlaminate areas surrounding the individual holes; removing the stator from the unhardened material and hardening said material to bond the laminations together while maintaining the compressive force on the core in the vicinity around each passageway whereby the individual laminations in the respective interlaminate areas assume substantially the same relative positions with respect to one another when a compressive force of the same general magnitude of another compressive force is subsequently re-applied to the core in the same location.

5. A method of forming a magnetizable core for use in an electric inductive device from a number of laminations each having a plurality of spaced apart openings comprising the steps: holding the laminations in stacked relation, with the openings aligned to form passageways extending axially through the stack; introducing unhardened adhesive material having a Brookfield No. 1 viscosity at r.p.m. below 100 centipoises between next adjacent laminations while concurrently holding interlaminate and uninsulated regions of next adjacent laminations in the immediate vicinity of selected passageways in intimate contact with sufficient force to prevent the material from covering said regions; and hardening said adhesive material to bond the laminations together while maintaining said regions of next adjacent laminations in intimate contact whereby the laminations are formed into a rigid core of low compressibility in which next adjacent laminations have little tendency to shift radially relative to one another.

6. A method of forming a stator for use in a dynamoelectric machine having a core fabricated from a number of laminations each having a plurality of openings and a plurality of holes spaced from the openings comprising steps: forming the laminations into a stack having the openings aligned to define respectively a rotor accommodating bore and winding accommodating means, and having the holes aligned to define passageways extending axially through the core for receiving means to attach the stator onto a support; arranging at least one winding in the winding accommodating means; establishing engagement between regions in the immediate vicinity of selected holes in next adjacent laminations by applying a predetermined compressive force to the stack at some of the passageways; introducing unhardened thermoresponsive adhesive material between next adjacent laminations while concurrently retaining the engagement of next adjacent regions to prevent the material from covering said regions and applying the material to selected parts of the winding; and hardening said adhesive material to hold the selected winding parts together in a rigid mass and to bond the laminations together whereby the individual laminations in the respective regions of the formed stator tend to assume substantially the same relative positions with respect to one another when a compressive force of the same general magnitude is subsequently re-applied to the core at the same respective passageways.

7. The method of claim 5 in which some of the passageways carry winding coils when the unhardened adhesive material is introduced between next adjacent laminations, during such introduction, unhardened adhesive material is also applied to selected parts of the winding coils; and during the hardening step of the material between next adjacent laminations, the material on the selected winding coil parts is concurrently hardened.

8. The method of manufacturing a laminated magnetic core for use in an electric inductive device, the core having a stack of laminations, a plurality of separated interlaminate uninsulated regions of next adjacent laminations adapted to provide intimate engagement at such separated interlaminate uninsulated regions and hardened interlaminate insulating material covering other interlaminate regions; the method comprising the steps of: holding the laminations together in stacked relation, with the plurality of separated interlaminate uninsulated regions of next adjacent laminations in facing relation, and with unhardened insulating material covering other interlaminate regions of the next adjacent laminations; and hardening said insulating material while maintaining the next adjacent laminations under compression by applying sufficient compressive forces at the separated interlaminate uninsulated regions to produce intimate engagement of adjacent separated interlaminate uninsulated regions whereby the individual laminations at the separated interlaminate uninsulated regions are sufficiently free of hardened insulating material and tend to assume generally the same intimate engagement relative to one another when compressive forces of the same general magnitudes are subsequently re-applied to the stack at approximately the same locations, thereby producing a laminated magnetic core having low compressibility characteristics.

9. The method of manufacturing the laminated magnetic core of claim 8 in which the individual laminations in stacked relation include a plurality of aligned openings respectively forming a rotor receiving bore and passageways extending axially through the laminated magnetic core, with the plurality of separated interlaminate uninsulated regions being located in the immediate vicinity of the passageways; and during the step of hardening said insulating material while maintaining the next adjacent laminations under compression by applying the forces at the uninsulated regions, the respective separated interlaminate uninsulated regions are kept substantially free of the hardened insulating material in the immediate vicinity of the pasageways.

10. A method of forming a magnetizable core having low compresibility characteristics, for use in an electric inductive device, from a number of laminations of generally similar configuration having spaced apart openings, the method comprising the steps of: maintaining the number of laminations of generally similar configuration in stacked relation, with selected openings being in aligned relation to form selected passageways through the stack, with unhardened adhesive material being disposed between next adjacent laminations, and with separated pressure regions being created in the immediate vicinity of the selected passageways by individually applied compressive forces thereto; and hardening the unhardened adhesive material while maintaining the separated pressure regions in the immediate vicinity of the selected passageways to produce a core having low compressibility characteristics.

11. The method of claim 10 in which the separated pressure regions are created in the immediate vicinity of the selected passageways by the individually applied compressive forces which includes holding the stacked laminations against separated planar surfaces in pressure engagement with an end face of the stacked laminations in the immediate vicinity of the selected passageways, whereby the need for machining the core at those locations on the end face is eliminated.

12. A method of forming a stator core from a number of relatively thin laminations comprising the steps of: holding the relatively thin laminations in stacked relation, with the individual laminations having aligned apertures and spaced apart openings respectively forming a bore having an axis and spaced apart bolt holes, and with unhardened bondable material disposed between next adjacent laminations; applying individual predetermined compressive forces independently to the laminations respectively at spaced apart locations in the vicinity of the bolt holes to create individual predetermined separated pressure regionn solely around the bolt holes; and hardening the unhardened bondable material while maintaining the individual predetermined pressure regions solely around the bolt holes, whereby similar separated pressure regions tend to be re-created upon subsequently re-applied individual predetermined compressive forces of the same general magnitudes.

13. The method of claim 12 in which the applying of the individual predetermined compressive forces respectively creating the separated pressure regions solely around the bolt holes includes holding spaced apart planar surfaces tightly against an end face of the stack of laminations at the bolt holes with the planar surfaces being generally perpendicular to the axis so that subsequent machining of the end face around the bolt holes is not required.

References Cited

UNITED STATES PATENTS

| | | | |
|---|---|---|---|
| 2,423,869 | 7/1947 | Blessing. | |
| 2,917,643 | 12/1959 | Mihanowich | 29—596 X |
| 3,100,080 | 8/1963 | Fiechter | 156—92 X |
| 3,304,358 | 2/1967 | De Jean et al. | 310—258 X |

JOHN F. CAMPBELL, Primary Examiner

C. E. HALL, Assistant Examiner

U.S. Cl. X.R.

29—609; 310—42, 45, 217, 259